G. W. JOHNSON.
RELIEF VALVE AND SYSTEM FOR MOTOR OR OTHER DRIVEN PUMPS.
APPLICATION FILED DEC. 12, 1912.
1,102,273.
Patented July 7, 1914.
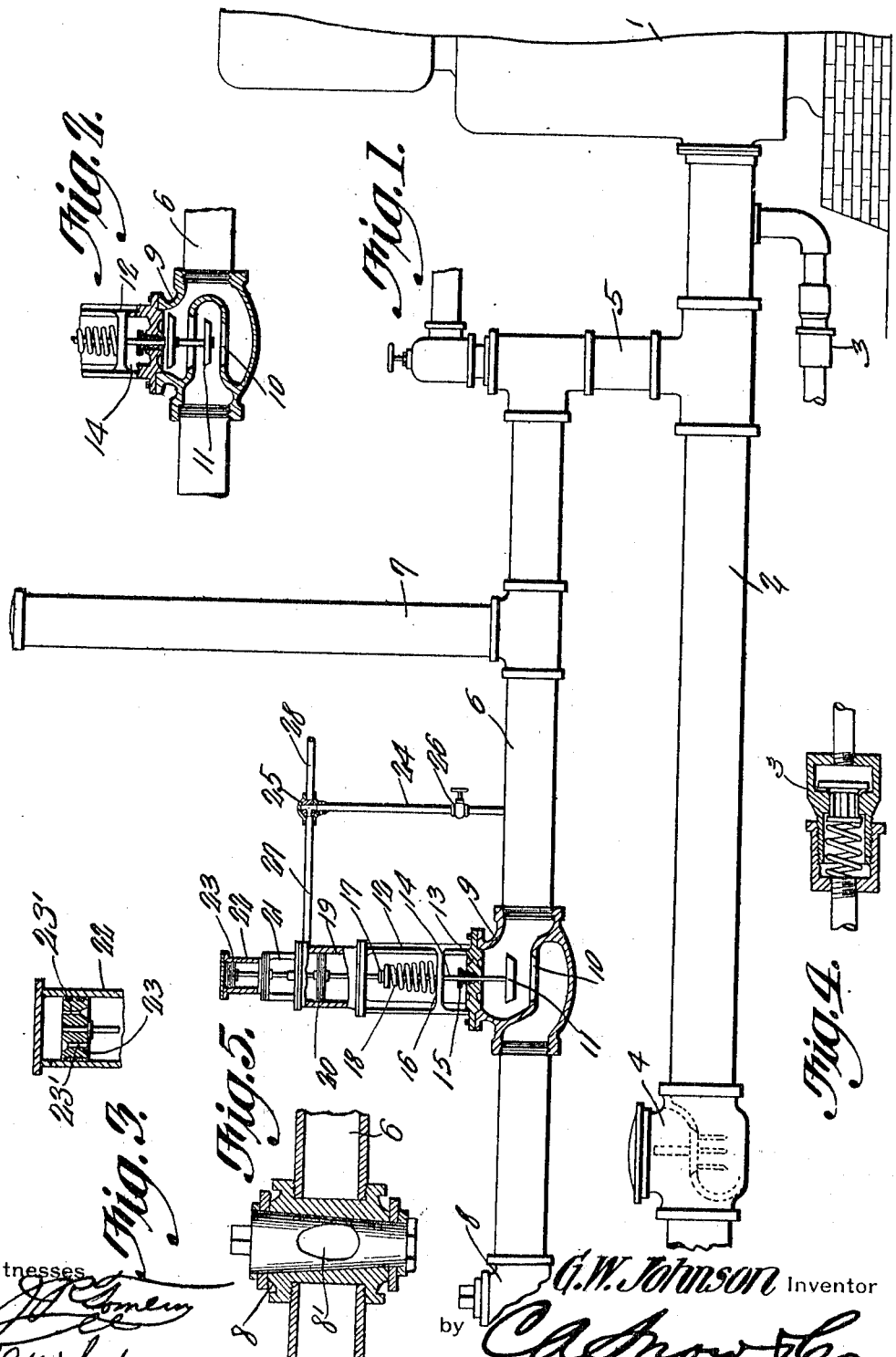
Witnesses
G. W. Johnson, Inventor
by C. A. Snow & Co.
Attorneys

UNITED STATES PATENT OFFICE.

GEORGE WALTER JOHNSON, OF LUFKIN, TEXAS.

RELIEF VALVE AND SYSTEM FOR MOTOR OR OTHER DRIVEN PUMPS.

1,102,273.     Specification of Letters Patent.     Patented July 7, 1914.

Application filed December 12, 1912. Serial No. 736,435.

*To all whom it may concern:*

Be it known that I, GEORGE W. JOHNSON, a citizen of the United States, residing at Lufkin, in the county of Angelina and State of Texas, have invented a new and useful Relief Valve and System for Motor or other Driven Pumps, of which the following is a specification.

The present invention relates to improvements in a relief valve and system for motor or other driven pumps, the primary object of the invention being the provision of a means for relieving the motor and pump, when starting, of the pressure from a high head or column of water, such relief valve and system being automatic in operation and depending entirely upon the pressure of water when the motor or other driven pump is actuated.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a view in elevation of a portion of a pump with the present relief valve in operable relation thereto. Fig. 2 is a modified form of valve used in lieu of the valve shown in Fig. 1. Fig. 3 is an enlarged detail sectional view of the upper chamber and piston of the relief valve. Fig. 4 is a sectional view of an ordinary form of spring check or relief valve used in this system. Fig. 5 is a sectional view of an adjustable valve or cock used with the present system.

Referring to the drawings, and more particularly to Fig. 1 thereof, the numeral 1 designates the pump, having a discharge pipe 2, which is provided with an ordinary construction of spring check or relief valve 3 and also a check valve 4. Attached to the discharge pipe 2 between the relief valve 3 and the check valve 4, is a vertical pipe 5, which has connected thereto, the horizontal drain pipe 6; and connected in the drain pipe is the vertically disposed air chamber 7. Also disposed in the drain pipe 6 at a point remote from the air chamber 7 is a cock or valve 8, while interposed between the said valve 8 and the air chamber 7 is a valve casing 9, the same being the main casing of the relief valve which constitutes the main feature of the invention. The casing 9 is provided with the valve seat 10 controlled by the disk valve 11 and carried by the casing 9, upstanding therefrom is a frame 12, whose lower end carries the partition 13 through which is slidably mounted the valve stem 14 carrying the valve 11, a stuffing box 15 being provided to prevent leakage from the casing 9. A spider 16 is formed within the frame 12 and mounted upon the valve stem within the frame is a washer 17 which acts as a retaining means for the upper end of the coiled spring 18, whose lower end is held against the spider 16, so that the spring exerts a normal tension to elevate the valve 11 to retain it in the position, as shown in Fig. 1. Disposed above the frame 12 is a chamber 19 in which is slidably mounted the piston 20 which is connected to the upper end of the valve stem 14 and is mounted for seating the valve 11 upon its seat 10, as will presently appear. A frame 21 is mounted upon the cylinder 19, and carried by the frame 21, is a cylinder 22, in which is mounted the piston 23 connected upon the extreme end of the stem 14. The upper chamber 22 is filled with a liquid and acts in the nature of a dash-pot both in the lowering and elevating of the valve 11. It will thus be seen that under normal conditions, the spring 18 will hold the valve 11 off of the valve seat 10, but that in order to close the valve or move the same against the tension of the spring 18, a pipe 24 is connected into the pipe 6, and is provided with a three-way valve 25 at the upper end thereof and has one branch 27 leading into the upper end of the cylinder 19, so as to supply liquid above the piston 20 and consequently in opposition to the spring 18, a conduit 28 being led from the opposite side of the three-way valve 25.

By reason of the frame 21 being open, the washer or retention device 17 upon the stem 14 is readily accessible for regulating the tension of the spring 18, thus providing a means whereby the automatic control of the valve 11 may be regulated to a nicety and also permitting ready access to the necessary parts of the device. It will thus be seen that when the pump 1 has been shut down, the pressure in the pipe 2 being reduced, due to leakage past the pump valve, that the pressure beyond the check valve 4 will automatically close the valve 4, thus shutting water off from the stand pipe or the column to which the water has been supplied, and as the pressure is released in the conduits 24 and 27, due to the pump stopping, the leakage of the water past the pump valves, and also the closing of the valve 4, the spring 18 will be free to elevate the valve 11 from the seat 10. Thus free passage of the water through the port of the seat 10, the pipe 6 and the valve casing 8 is permitted. The parts will thus remain in this position until the pump is again started.

When the pump is again started by any power means, preferably an electrical motor controlled from a distant point, the liquid will pass backward through the conduit 6 and out of the valve 8, the pressure from the pump gradually increasing, and as the valve 8 has been set beforehand, to a point near the capacity of the pump, the water will be retarded to such an extent as to be forced or led into the pipe 2, and finally also through the pipes 24 and 27 into the chamber 19 above the piston 20. The piston 20 will now be forced downwardly against the tension of the spring 18 to seat the valve 11 upon its seat 10 and thus cut off the flow of water toward the valve 8 so that the complete flow from the pump will be forced through the pipe 2 and check valve 4. The action of the valve downwardly is retarded to the desired degree by means of the dash-pot, consisting of the cylinder 22 and piston 23, which as before stated is filled with a liquid, preferably oil. The water is thus directed into the stand pipe or tower (not shown), the pressure being accumulated during the closing of the relief valve 11, and as the valve 8 and the spring 18 are readily adjustable, the pressure necessary to actuate the relief valve 11 may be regulated to an exactness. The piston 23 is provided with two ports 23' to permit a slight flowing or by-passing of the oil from one side of the piston to the other within the cylinder. By this arrangement it will be seen that the valve is opened by the spring 18 and closed by pressure. The spring 18 holds open the valve at the initial starting and up to the time the maximum pressure is exerted by the pump. The valve 8 is so adjusted as to permit the free passage of water therethrough without producing any material increase in pressure at the pump side thereof, and until the pump discharge exceeds the capacity of the opening of the valve 8, whereupon the pressure will rapidly accumulate on the pump side of the valve 8 until it is sufficient to act upon the piston 20, to overcome the spring 18 and close the valve 11.

It is evident that the present form of relief valve may be readily attached to the pipe 2 leading from the pump 1, and that after its proper adjustment, relieves the pump upon its initial starting and permits the load to be thrown upon the pump as the speed of the pump increases. The action of the device is entirely automatic, being operated by pressure due to the pump operating and the limiting of the water passing through an orifice or port 8', in the cock or manually controlled valve 8, the present device requiring no attention whatever from the operator of the pump, which in the case of an electrically operated pump, can be controlled from a distant point, while the present device is located directly at the pump. This device will relieve the pump and motor in starting from the pressure of the high head or the long column of water, the relief valve closing when the pump and motor reaches its speed, or when the same is closed down from a distant point, the valve in the system automatically adjusting itself for the next starting of the motor and pump.

The valve 3 which is particularly shown in Fig. 4, will automatically open due to its spring when the pressure is relieved in the pipe 2 due to the closure of the check valve 4, thus draining the pipes 6 and 5 and also the pump casing. The pressure exerted during the operation of the pump, overcomes the spring of the pressure relief and drain valve 3 and closes the valve so that the water is properly directed through the pipe 2 and check valve 4 as before described.

A double beat valve is shown in Fig. 2, it otherwise being similar to the valve installed in Fig. 1.

It is evident that when the valve 25 is operated to prevent the passage of water from the main 6 and through the conduit 24 and through the valve 25 into the conduit 27, that the action of the relief valve 11, is not automatic, but that when the valve 25 is retained in the position, as shown in Fig. 1, the opening of the valve 11 is automatic and is controlled entirely due to the pressure of the water within the conduit or pipe 6.

The valve 8 may be either an ordinary valve or an adjustable nozzle, its function being to retard the liquid and to impede the water and permit the pressure to rise to such a degree, as to operate the valve 11 through the admission of the pressure through the conduits 24 and 27, its particular position, however, being important in that it must be beyond the valve casing 9 or 9' to produce this result.

The spring check valve 3 is a valve disposed to close by the velocity of the water and the same may be set to relieve at any desired pressure, it being preferably constructed as clearly shown in Fig. 4.

What is claimed is:

1. In a pressure relief system, a pump, a conduit leading therefrom, a check valve in said conduit, a branch conduit leading from said first conduit intermediate of the pump and check valve, a valve casing mounted in said branch conduit between the adjustable valve and the connection of the branch conduit to the main conduit, a frame carried by said valve casing, and having a cylinder mounted thereon, a stem mounted concentrically of the cylinder and projecting into the valve casing, a valve upon the lower end of the stem, a spring for normally holding the valve unseated, a piston upon the stem within the cylinder, and an auxiliary conduit connected to the branch conduit and to said cylinder, whereby the retardation of the pressure or flow of water within the branch conduit due to the adjustable valve and the passage of the fluid into the auxiliary conduit will actuate the piston to close the valve in opposition to the spring.

2. In a pressure relief system, a pump, a conduit leading therefrom, a check valve in said conduit, a branch conduit leading from said first conduit intermediate of the pump and check valve, a valve casing mounted in said branch conduit between the adjustable valve and the connection of the branch conduit to the main conduit, a frame carried by said valve casing and having a cylinder mounted thereon, a stem mounted concentrically of the cylinder and projecting into the valve casing, a valve upon the lower end of the stem, a spring for normally holding the valve unseated, a piston upon the stem within the cylinder, an auxiliary conduit connected to the branch conduit and to said cylinder, whereby the retardation of the pressure or flow of water within the branch conduit due to adjustable valve and the passage of the fluid into the auxiliary conduit will actuate the piston to close the valve in opposition to the spring, and a retarding means disposed upon the extreme upper end of the stem for timing the action of the opening and closing of the valve.

3. The combination with a pump, and a main conduit provided with a check valve, of a pressure relief attachment for the pump, including a branch conduit connected to the main conduit intermediate of the pump and check valve, an adjustable valve disposed in the branch conduit for regulating the flow of fluid through the branch conduit, a valve casing disposed in the branch conduit between the adjustable valve and the connection of the branch conduit to the main conduit, a valve mounted in said casing, a stem connected to said valve and extending exteriorly of the casing, a cylinder supported from the valve casing, a piston mounted in said cylinder and connected to the valve stem, a spring mounted upon the valve stem between the valve casing and cylinder, said spring normally exerting a tension to hold the valve unseated, and a valve controlled auxiliary conduit connected to the branch conduit and to the cylinder whereby the cylinder actuates the valve in opposition to the spring due to the retardation of the flow of water by the adjustable valve and the increase of pressure within the branch conduit.

4. The combination with a pump, a main conduit provided with a check valve, of a pressure relief attachment for the pump, including a branch conduit connected to the main conduit intermediate of the pump and check valve, an adjustable valve disposed in the branch conduit for regulating the flow of liquid through the branch conduit, a valve casing disposed in the branch conduit between the adjustable valve and the connection of the branch conduit to the main conduit, a valve mounted in said casing, a stem connected to said valve and extending exteriorly of the casing, a cylinder supported from the valve casing, a piston mounted in said cylinder and connected to the valve stem, a spring mounted upon the valve stem between the valve casing and cylinder, said spring normally exerting a tension to hold the valve unseated, a valve controlled auxiliary conduit connected to the branch conduit and to the cylinder, whereby the cylinder actuates the valve in opposition to the spring due to the retardation of the flow of liquid by the adjustable valve and the increase of pressure thereof within the branch conduit, a cylinder mounted upon and carried by the first cylinder, a valve stem extending concentrically thereinto, said cylinder containing a liquid, and a piston mounted in said last cylinder and constituting with the liquid therein a retarding means for the valve.

In testimony that I claim the foregoing as my own, I have hereto affixed my signature in the presence of two witnesses.

GEORGE WALTER JOHNSON.

Witnesses:
N. D. SHARDS,
W. S. PAGE.